(12) United States Patent
Suzuki et al.

(10) Patent No.: US 6,722,864 B2
(45) Date of Patent: Apr. 20, 2004

(54) FUEL INJECTION PUMP

(75) Inventors: Masashi Suzuki, Obu (JP); Akihiro Kuroda, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/315,120

(22) Filed: Dec. 10, 2002

(65) Prior Publication Data

US 2003/0108443 A1 Jun. 12, 2003

(30) Foreign Application Priority Data

Dec. 12, 2001 (JP) ........................... 2001-378604
Dec. 27, 2001 (JP) ........................... 2001-396357
Jan. 8, 2002 (JP) ........................... 2002-001429

(51) Int. Cl.[7] ..................... F04B 19/00; F04B 37/00
(52) U.S. Cl. ..................... 417/470; 92/72; 92/153; 74/567; 74/596; 123/456; 123/495
(58) Field of Search ..................... 417/470; 92/72, 92/153; 74/567, 596; 123/456, 495

(56) References Cited

U.S. PATENT DOCUMENTS 3,628,425 A * 12/1971 Morita et al. ................ 91/491
4,223,595 A * 9/1980 Ortelli ........................ 92/72
6,289,875 B1 * 9/2001 Shinohara et al. ........ 123/450
2001/0015200 A1 * 8/2001 Mori ......................... 123/495
2002/0189438 A1 * 12/2002 Furuta ....................... 92/72
2003/0101970 A1 * 6/2003 Utsumi ..................... 123/495

FOREIGN PATENT DOCUMENTS

JP          5-332222          12/1993

* cited by examiner

Primary Examiner—Justine R. Yu
Assistant Examiner—William H. Rodriguez
(74) Attorney, Agent, or Firm—Nixon & Vanderhye P.C.

(57) ABSTRACT

In a fuel injection pump, fuel pressurized by a feed pump is supplied to an accommodation chamber via a communication path having an orifice. An end of the communication chamber on a side of the accommodation chamber is positioned to face an axial end of a minute space between sliding contact portions of a cam and a bush when the cam is at a given angular position. The fuel fed from the feed pump is injected from the end of the communication path axially deep into the minute space between the sliding contact portions so that oil film for lubrication is formed on the sliding contact portions, resulting in suppressing frictional seizure of the sliding contact portions.

7 Claims, 11 Drawing Sheets

FUEL INJECTION PUMP

CROSS REFERENCE TO RELATED APPLICATION

This application is based upon and claims the benefit of priority of Japanese Patent Application Nos. 2001-378604 filed on Dec. 12, 2001, 2001-396357 filed on Dec. 27, 2001 and 2002-1429 filed on Jan. 8, 2002, the contents of which are incorporated herein by reference.

BACKGROUND OF THE INVENTION

1. Field of the Invention

The present invention relates to a fuel injection pump for an internal combustion engine (hereinafter called "engine") in which fuel is supplied from a feed pump to an accommodation chamber for well lubricating sliding contact portions of component parts accommodated therein.

2. Description of the Prior Art

A conventional fuel injection pump for a diesel engine has a cam for driving a plunger. In this pump, fuel is sucked and pressurized in a pressure chamber by reciprocating movement of the plunger axially slidable in a cylinder. A rotating movement of a drive shaft to be driven by an engine is converted to the reciprocating movement of the plunger inside the cylinder via the cam connected with the drive shaft and a cam ring disposed between the cam and the plunger. The plunger, the cam and the cam ring are disposed in an accommodation chamber.

To improve engine output and fuel consumption and to reduce emission such as NOx and black smoke to be exhausted from the engine, higher fuel injection pressure has been recently demanded.

To secure the higher fuel injection pressure, it is necessary to increase pressure of fuel to be pressurized by and discharged from the fuel injection pump, so higher load is applied to the fuel injection pump. Typically, sliding contact portions of an outer surface of the cam and an inner circumference of the cam ring receive larger forces. To reduce frictional seizure and frictional wear of the sliding contact portions, the conventional pump has a bush interposed between the cam and the cam ring. However, since the force applied to the bush is very high, life time of the bush is shorter and, at worst, frictional seizure of the sliding contact portions tends to occur.

As one of the solutions, the pump may have a larger bush whose sliding contact area is larger so that force applied to a unit area of the bush is smaller. However, the larger bush causes a body of the fuel injection pump larger, which does not meet a recent demand in that a compact and light weight pump is required.

As another one of the solutions, the outer circumference of the cam or the inner circumference of the bush may have an oil groove for promoting lubrication of oil on the sliding contact portions of the cam and the bush. However, the oil groove has to be positioned to a limited area of the cam or the bush in order not to sacrifice power transmission functions of the cam and bush so that their designing freedom is narrowed.

Further, as shown in FIG. 14, a bush 100 may have a recess 101. An inner circumferential surface 100a of the bush 100 is formed axially in round shape. Diameter of the inner surface 100a of the bush 100 is larger from both axial ends thereof toward a center thereof so that the both axial ends are always in contact with an outer circumference 210a of a cam 210. Fuel once entered the recess 101 tends to be stagnant in the recess 101. Therefore, temperature of fuel in the recess 101 is prone to increase due to heat generated by the sliding contact between the cam 200 and the bush 100 so that deformation or frictional seizure of the cam 210 and the bush 100 is likely to occur. Further, pressure of fuel in the recess 101 tends to decrease, if the recess 101 is too large, so that adequate formation of oil film for lubricating the sliding contact portions of the cam 200 and the bush 100 is not sufficiently secured.

As mentioned above, it is important not only to form the adequate formation of the oil film between the sliding contact portions, but also to radiate heat of the sliding contact portions in the accommodation chamber. For this purpose, the conventional fuel injection pump has a feed pump driven also by the drive shaft for supplying fuel sucked from a fuel tank to the pressure chamber. The feed pump also supplies a part of the fuel to the accommodation chamber where the cam connected to the drive shaft, the cam ring, the bush and the plunger are accommodated.

Temperature of the fuel supplied to the accommodation chamber increases due to heat generated by the sliding contact portions. Therefore, the conventional fuel injection pump has a circulation flow passage through which the accommodation chamber communicates with a fuel tank, so the fuel discharged from the feed pump is returned to the fuel tank via the accommodation chamber through the circulation flow passage, which serves to lubricate the sliding contact portions and to cool the housing in which the accommodation chamber is formed.

Further, to prevent the pressurized fuel in the accommodation chamber from leaking through a clearance between the housing and the drive shaft to an outside of the fuel injection pump, an oil seal is disposed between the housing and the drive shaft. The oil seal is partly deformed radially to ensure sealing effect by pressure of the fuel fed thereto from the accommodation chamber.

However, if the fuel in the circulation flow passage is blocked by some reasons, the fuel in the accommodation chamber is not returned to the fuel tank so that pressure of fuel in the accommodation chamber increase. As a result, higher pressure of the fuel in the accommodation chamber is applied to the oil seal, causing the oil seal to be damaged.

SUMMARY OF THE INVENTION

An object of the present invention is to provide a compact fuel injection pump at less manufacturing cost.

Another object of the present invention is to provide a fuel injection pump in which fuel is forcibly supplied to sliding contact portions to form an oil film for lubrication in a minute space therebetween so that frictional seizure of the sliding contact portions is unlikely to occur and life time thereof is longer.

A further object of the present invention is to provide a fuel injection pump in which fuel for lubrication easily circulates through sliding contact portions within an accommodation chamber so that heat generated by the sliding contact portions is effectively radiated.

A still further object of the present invention is to provide a fuel injection pump in which an oil seal is hardly damaged.

To achieve the above object or objects, a fuel injection pump has a drive shaft, a cam formed eccentrically and integrally with the drive shaft, a cam ring, a bush whose outer circumference is fixed to inner circumference of the cam ring and whose inner circumference is slidably fitted to outer circumference of the cam shaft so that sliding contact portions of the cam and the bush are formed, a housing provided with a cylindrical bore, a plunger axially and reciprocatingly movable in the cylindrical bore via the cam, the bush and the cam ring by the drive shaft, so that axial end of the plunger is in slidable contact with outer circumference of the cam ring and another axial end thereof and the cylindrical bore form a pressure chamber, an accommodation chamber formed in the housing for accommodating the plunger, the bush, the cam ring and the cam, a feed pump whose outlet side communicates with the pressure chamber for supplying fuel to the pressure chamber according to rotation of the drive shaft, and a communication path through which the outlet side of the feed pump also communicates with the accommodation chamber for supplying a part of the fuel discharged from the feed pump to the accommodation chamber.

In the fuel injection pump mentioned above, an end of the communication path on a side of the accommodation chamber is opened to face an axial end of a minute space between the sliding contact portions of the cam and the bush when the cam is at a given angular position. With this construction, fuel flowing via the communication path to the accommodation chamber is sprayed axially deep into the minute space between the sliding contact portions from the axial end thereof. Accordingly, the oil film for lubrication is adequately formed on the sliding contact portions so that the frictional seizure of the contact sliding portions hardly occurs. Since only position of the end of the communication path on a side of the accommodation chamber is defined, shapes of the cam and the bush can be freely designed, which achieves a compact fuel injection pump at less manufacturing cost.

In the fuel injection pump, as an alternative, the cam ring may be provided with a recess formed on the outer circumference thereof and a guide hole through which the recess communicates with a minute space between the sliding contact portions of the cam and the bush.

In this case, the end of the communication path on a side of the accommodation chamber may be opened to any position of an inner wall of the accommodation chamber. Even if the axial end of the communication path is positioned radially outside the cam ring, fuel is supplied to the sliding contact portions through the guide hole.

If the end of the communication path on a side of the accommodation chamber is positioned to face the axial end of a minute space between the sliding contact portions of the cam and the bush when the cam is at a given angular position, the sliding contact portions is filed not only with the fuel sprayed axially from the communication path to the accommodating chamber but also with the fuel fed through the recess and the guide hole.

The recess may be a groove extending axially along an axis of the drive shaft from an end of the outer circumference thereof on a side of the communication path toward another end of the outer circumference thereof on a side opposite to the communication path. In this case, the end of the communication path on a side of the accommodation chamber may be positioned to face the axial end of the groove on a side of the communication path when the cam is at a given angular position. With this construction, fuel flowing via the communication path to the accommodation chamber is sprayed to the axial end of the groove so that fuel is forcibly introduced through the groove and the guide hole to the sliding contact portions. Accordingly, the oil film for lubrication is adequately formed on the sliding contact portions, which reduces the frictional seizure of the contact sliding portions.

The groove may come to a dead-end before reaching the end of the outer circumference of the cam ring on a side opposite to the communication path. In this case, the fuel flowing along the groove hits against the dead end so that the fuel deflected is easily introduced into the guide hole.

It is preferable that one end of the guide hole communicates with the recess or groove and another end thereof communicates with the minute space between the sliding contact portions of the cam and the bush in a vicinity of an axial center of the cam ring. Though the fuel normally enters the minute gap between the sliding contact portions from the opposite axial ends thereof so that formation of the oil film for lubrication in a vicinity of the axial center of the cam ring tends to be insufficient, the groove and the guide hole make it possible that entire axial surfaces of the sliding contact portions are covered uniformly with oil film for lubrication.

As another alternative, at least one of the inner circumference of the bush and the outer circumference of the cam may gradually protrude radially toward the other one of the inner circumference of the bush and the outer circumference of the cam from the axial opposite ends to the axial center thereof.

Only one of the inner circumference of the bush and the outer circumference of the cam may gradually protrude radially toward the other one of the inner circumference of the bush and the outer circumference of the cam that has axially flat surface.

It is preferable that the one of the inner circumference of the bush and the outer circumference of the cam is formed axially in a curve. Preferably, a protruding amount t of the one of the inner circumference of the bush and the outer circumference of the cam falls within a range of 0 mm<t≦0.01 mm.

Further, not only the inner circumference of the bush may protrude radially inward toward the outer circumference of the cam but also the outer circumference of the cam may protrude radially outward toward the inner circumference of the bush. In this case, each of the inner circumference of the bush and the outer circumference of the cam is formed axially in a curve and, preferably, a sum t of a protruding amount of the inner circumference of the bush and a protruding amount of the outer circumference of the cam falls within a range of 0 mm<t≦0.01 mm.

With the fuel injection pump having at least one of the inner circumference of the bush and the outer circumference of the cam that is formed axially in a curve, even if the position of the end of the communication path on a side of the accommodation chamber is not limited to a given point of the inner wall of the accommodation chamber, the fuel can easily enter the sliding contact portions from the opposite axial ends of the bush or the cam toward the axial center thereof so that the oil film for lubrication is easily formed between the inner circumference of the bush and the outer circumference of the cam.

Further, the fuel heated due to sliding contact between the cam and the bush can be easily ejected to an outside and does not remain in the minute space between the sliding contact portions so that the bush and the cam are hardly damaged by heat, contrary to the prior art.

As a further alternative, it is preferable that the fuel injection pump has a fuel return passage through which the accommodation chamber communicates with the inlet side of the feed pump and a check valve disposed in the fuel return passage for permitting fuel flow from the accommodation chamber to the inlet side of the feed pump when pressure of the accommodation chamber exceeds a given value.

If a fuel circulation passage for ejecting the fuel from the accommodating chamber is blocked or stuffed with foreign material containing in the fuel, fuel pressure in the accommodation chamber increases. As a result, higher pressure of the accommodation chamber is applied to an oil seal for sealing the drive shaft and the housing. In case that the pressure of fuel applied to the seal exceeds endurable pressure of the oil seal, the oil seal tends to be damaged.

However, according to the fuel injection pump mentioned above, the check valve disposed in the fuel return passage is opened before the pressure of accommodation chamber exceeds the endurable pressure of the oil seal, so the fuel in the accommodation chamber is returned to the inlet side of the feed pump without increasing abnormally the pressure of the accommodation chamber.

It is preferable that a temperature sensor is installed in the accommodation chamber for detecting temperature of fuel therein to control operation of the fuel injection pump and, when the temperature detected by the temperature sensor exceeds a given valve, an operation of the fuel injection pump stops.

When the check valve continuously opens, the fuel is circulated between the feed pump and the accommodation chamber. Due to the heat generated from the sliding contact portions, temperature of the fuel circulating between the feed pump and the accommodation chamber increases to an extent that the frictional seizure of the sliding contact portions may occur. However, since the temperature of the accommodation chamber is detected and, based on the detected temperature, the operation of the engine stops before the frictional seizure of the sliding contact portions occurs.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Preferred embodiments of the present invention are described with reference to drawings.

First Embodiment

Figure 1:
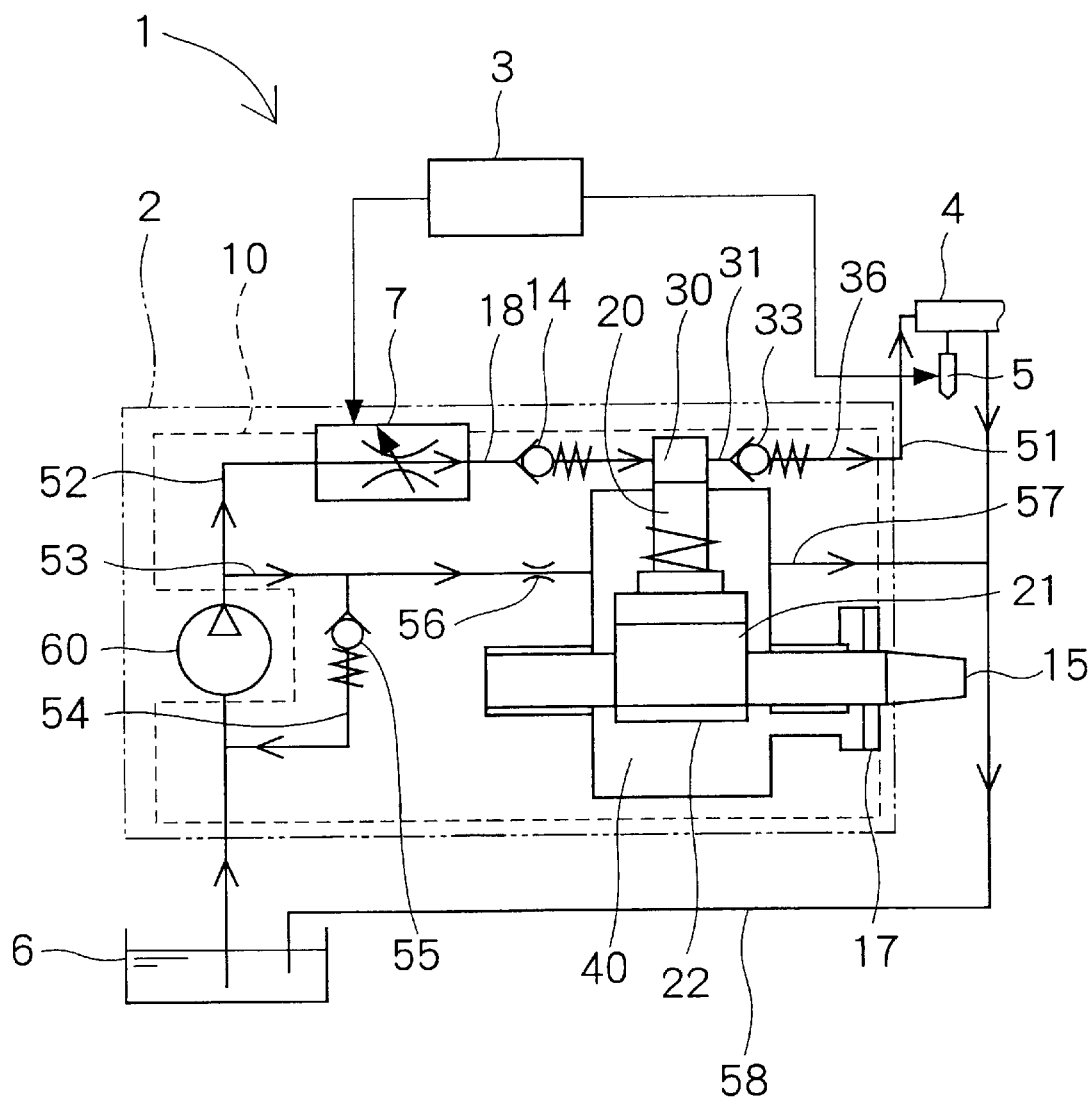
FIG. 1 is a schematic diagram of a fuel injection system incorporating a fuel injection pump according to a first embodiment of the present invention.
Figure 2:
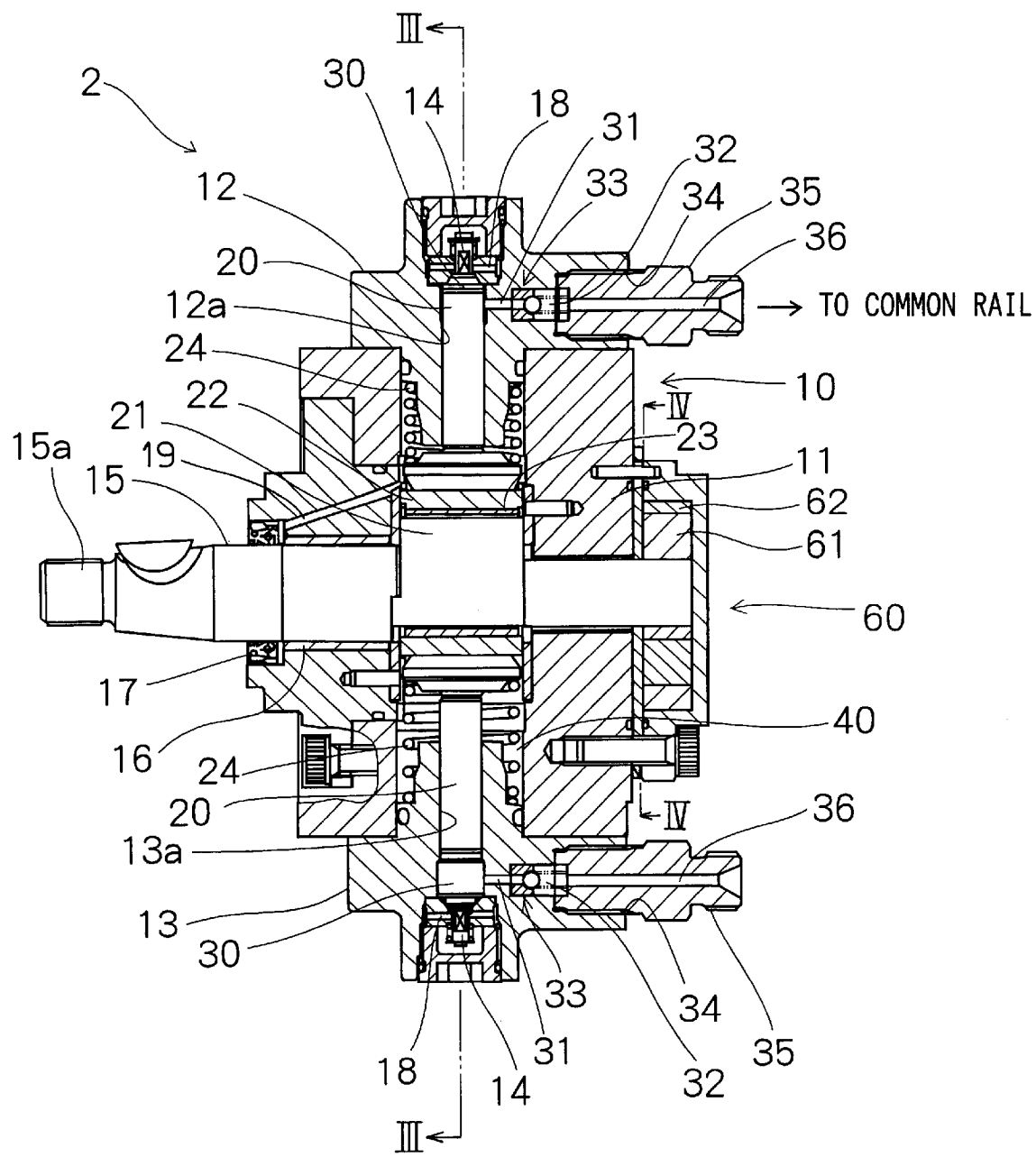
FIG. 2 is a cross sectional view of the fuel injection pump of FIG. 1.

FIG. 1 shows a common rail fuel injection system 1 and FIG. 2 shows a fuel injection pump 2 incorporated into the common rail injection system 1 according to a first embodiment.

As shown in FIG. 2, a housing 10 of the fuel injection pump 2 has an aluminum housing body 11 and iron cylinder heads 12 and 13. As shown in FIG. 1, the fuel injection pump 2 corresponds to a portion surrounded by a two dots-slash line and the housing 10 corresponds to a portion surrounded by a dotted line.

The cylinder heads 12 and 13 are provided respectively with cylindrical bores 12a and 13a in which plungers 20 are accommodated to move axially and reciprocatingly, respectively. Each axial end of the plungers 20, each of the cylindrical bores 12a and 13a and each end of check valves 14 form each of pressure chambers 30. According to the present embodiment, the cylinder head 12 is formed substantially in the same shape as the cylinder head 13 except positions of a threaded hole and a fuel passage. The positions of the threaded hole and the fuel passage of the cylinder head 12 may be same as those of the cylinder head 13.

Figure 3:
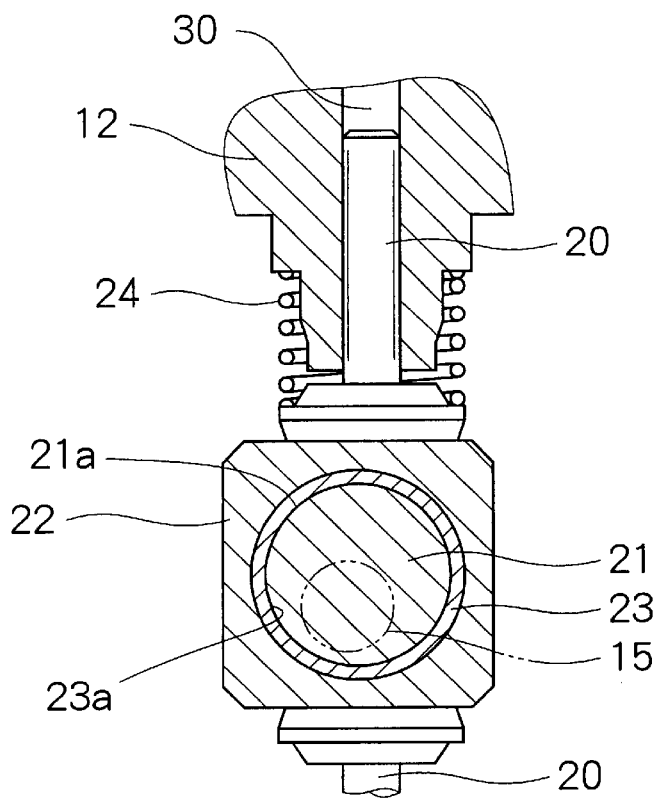
FIG. 3 is a cross sectional part view taken along a line III—III of FIG. 2.

A drive shaft 15 is held rotatably via a journal 16 by the housing 10. An oil seal 17 seals a clearance between the housing 10 and the drive shaft 15. As shown in FIG. 3, an eccentric cam 23, whose cross section is formed in circular shape and whose center axis is offset from a center axis of the drive shaft 15, is formed integrally with the drive shaft 15. The plungers 20 are arranged on opposite sides of the drive shaft 15 at about 180° angular intervals.

An outer circumference of a cam ring 22 is formed in quadrangular shape. A bush 23 is interposed slidably between the cam ring 22 and the cam 21. Each outer circumferential surface of the cam ring 22 and each axial end surface of the plunger 20, which are opposed to and in contact with each other, are flat.

Each of springs 24 urges each of the plungers 20 toward the cam ring 22. The cam ring 22 slides via the bush 23 on the cam 21 and revolves about the cam 21 without self-rotating according to rotation of the drive shaft 15 together with the cam 21 so that each of the plungers 20 in slidable contact with the cam ring 22 moves relatively to the cam ring 22 reciprocatingly in right and left directions in FIG. 2, while moving axially and recirocatingly in upward and downward directions in FIG. 2. The plungers 20 are driven via the cam 21 and the cam ring 22 by the rotation of the drive shaft 15 with 180° angular phase difference. The plunger 20 moves axially in the cylindrical bore 12a for pressuring fuel supplied via the check valve 14 from a fuel flow-in passage 18 to the pressure chamber 30. The check valve 14 serves to prevent reverse fuel flow from the pressure chamber 30 to the fuel flow-in passage 18.

The plungers 20, the drive shaft 15, the cam 21 and the cam ring 22 are housed in an accommodation chamber 40 formed by the housing body 11 and the cylinder heads 12 and 13. The accommodation chamber 40 is filed with fuel that is light oil. The housing body 11 is provided with a fuel passage 19 through which the accommodation chamber 40 communicates with the oil seal 17. The oil seal 17 is partly deformed radially to ensure sealing effect by pressure of the fuel fed thereto from the accommodation chamber 40.

As shown in FIG. 1, the common rail fuel injection system has ECU 3. ECU 3 judges engine operating conditions from various information such as engine revolution, acceleration opening degree, coolant temperature and so on, which are input thereto, and performs an entire control of the fuel injection system 1 including a control of the fuel injection pump 2.

Each of the cylinder heads 12 and 13 is provided with a fuel flow-out passage 31 extending in straight and communicates with each of the pressure chambers 30. The cylinder head 12 or 13 is provided on a downstream side of the fuel flow-out passage 31 with an elongated hole-shaped fuel chamber 32 whose fuel flow area is larger than that of the fuel flow-out passage 31. A check valve 33 is accommodated in the fuel chamber 32. An accommodation hole 34 whose fuel flow area is larger than that of the fuel chamber 32 is formed downstream the fuel chamber 32. The accommodation hole 34 is opened to an outer circumference of the cylinder head 12 or 13 for forming a fuel outlet. As shown in FIG. 2, a fuel pipe joint 35, through which a fuel pipe 51 shown in FIG. 1 is connected to the fuel injection pump 2, is screwed into the accommodation hole 34. The fuel pipe joint 35 is provided inside with a fuel passage 36 communicating with the fuel chamber 32. The fuel passage 36 is formed substantially on the same straight line as the fuel flow-out passage 31.

The check valve 33 arranged in the cylinder head 12 or 13 downstream the fuel flow-out passage 31 serves to prevent fuel reverse flow from the fuel chamber 32 positioned on a downstream side thereof via the fuel flow-out passage 31 to the pressure chamber 30. The fuel pipe joint 35 is connected to the fuel pipe 51 that is connected to a common rail 4, as shown in FIG. 1. The fuel pressurized in the fuel injection pump 2 is supplied via the fuel passage 36 and the fuel pipe 51 to the common rail 4. The fuel discharged from the fuel injection pump 2 is accumulated under high pressure in the common rail 4. High pressure fuel stored in the common rail is supplied to an injector 5 installed in each of engine cylinders (not shown). The injector injects the fuel supplied from the common rail to each of the engine cylinders at a given timing and for a given time period according to instructions from ECU 3.

As shown in FIG. 2, a feed pump 60, which is a trochoid pump driven by the drive shaft 15, is provided at an axial end of the drive shaft 15. The feed pump 60 has an inner rotor 61 and an outer rotor 62. The inner rotor 61 is fitted to and rotates together with the drive shaft 15. The feed pump 60 sucks fuel from a fuel tank 6, pressurizes and discharge it according to a relative rotation of the inner and outer rotors 61 and 62 based on rotation of the drive shaft 15.

As shown in FIG. 1, a flow amount adjusting valve 7 is provided in a fuel supply passage 52 connecting the feed pump 60 and the pressure chamber 30. The flow amount adjusting valve 7 has a spool valve operable to change a fuel path area in response to current supplied from ECU 3 and serves to adjust an amount of fuel to be supplied from the feed pump 60 to the pressure chamber 30. The amount adjustment of the fuel supplied from the feed pump 60 to the pressure chamber 30 means an amount adjustment of fuel discharged from the fuel injection pump 2 to the common rail 4, resulting in keeping pressure in the common rail 4 constant.

Figure 4:
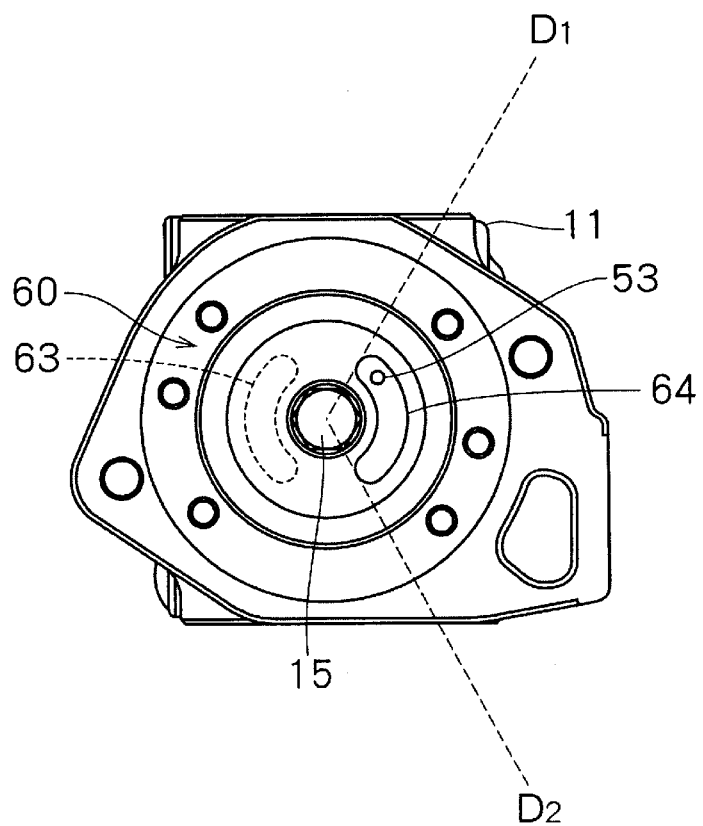
FIG. 4 is a cross sectional view taken along a line IV—IV in FIG. 2.

As shown in FIG. 4, the feed pump 60 has an intake port 63 and a discharge port 64. The intake port 63 communicates with the fuel tank 6 shown in FIG. 1. Fuel is sucked from the fuel tank 6 to the feed pump 60 through the intake port 63, which is an inlet side of the feed pump 60. The fuel pressurized by the feed pump 60 flows through the discharge port 64, which is an outlet side of the feed pump 60. The fuel flowed out from the discharge port 64 is distributed to the fuel supply passage 52 and a communication path 53, as shown in FIG. 1. A return flow path 54 is blanched out from the communication path 53. A check valve 55 is provided in the return flow path 54. When pressure of fuel in the fuel supply passage 52 exceed a given value, the check valve 55 opens so that surplus fuel is returned to the inlet side of the feed pump 60.

The accommodation chamber 40 communicates with the discharge port 64 through the communication path 53. Accordingly, the fuel discharged from the feed pump 60 is supplied not only to the pressure chamber 30 but also to the accommodation chamber 40 through the communication path 53. The communication path 53 is provided with an orifice 56 by which amount of fuel flowing from the feed pump 60 to the accommodation chamber 40 is restricted.

The fuel supply passage 52, the communication path 53 and the return flow path 54 are formed within the housing 10.

A fuel-ejecting path 57 communicates with the accommodation chamber 57. Surplus fuel of the accommodation chamber 40 is ejected through the fuel-ejecting path 57. An end of the fuel-ejecting path 57 on a side opposite to the accommodation chamber 40 communicates with a circulation flow passage 58. The circulation flow passage 58 communicates not only with the fuel-ejecting path 57 but also with the common rail 4 and the injectors 5. Surplus fuel at various portions of the fuel injection system 1 is ejected to the circulation flow passage 58 and returned to the fuel tank 6 communicating with the circulation flow path 58.

An operation of the fuel injection pump 2 is described below.

The inner rotor 61 of the feed pump 60 rotates according to rotation of the drive shaft 15 so that the inner and outer rotors 61 and 62 rotate relatively. Accordingly, the feed pump 60 compresses and discharges fuel sucked from the fuel tank 6. The fuel discharged from the feed pump 60 is supplied to the fuel amount adjusting valve 7 via the fuel supply passage 52.

The cam 21 rotates according to rotation of the drive shaft 15 so that the cam ring 22 revolves about the cam 21 without self-rotating. The revolution of the cam ring 22 causes the plunger 20 to move axially and reciprocating in the cylindrical bore 12a or 13a, while the axial end surface of the plunger 20 slidably and reciprocatingly move relatively to the outer circumferential surface of the cam ring 22.

When the plunger 20 moves from an upper dead point downward toward the drive shaft 15 according to the revolution of the cam ring 22, the fuel whose amount is adjusted by the flow amount adjusting valve 7 is flowed in the pressure chamber 30 via the check valve 14 from the fuel flow-in passage 18.

When the plunger 20 further moves from a lower dead point upward toward the upper dead point, the check valve 14 is closed so that pressure of the fuel in the pressure chamber 30 increases. When the pressure of the fuel in the pressure chamber 30 exceeds pressure of fuel of the fuel passage 36, the check valve 33 is opened so that the fuel pressurized in the pressure chamber 30 is discharged to the fuel passage 36.

The fuel discharged from the pressure chamber 30 is delivered via the fuel flow-out passage 31, the check valve 33 and the fuel chamber 32 to the fuel passage 36 and, then, via the fuel pipe 51 to the common rail 4 where pressure of fuel is kept constant by accumulating the fuel delivered with pressure fluctuation from the fuel injection pump 2. The fuel stored in the common rail is supplied to the injectors 5 which make open and close operation to inject fuel to the respective engine cylinders according to the instruction from ECU 3.

Figure 5A:
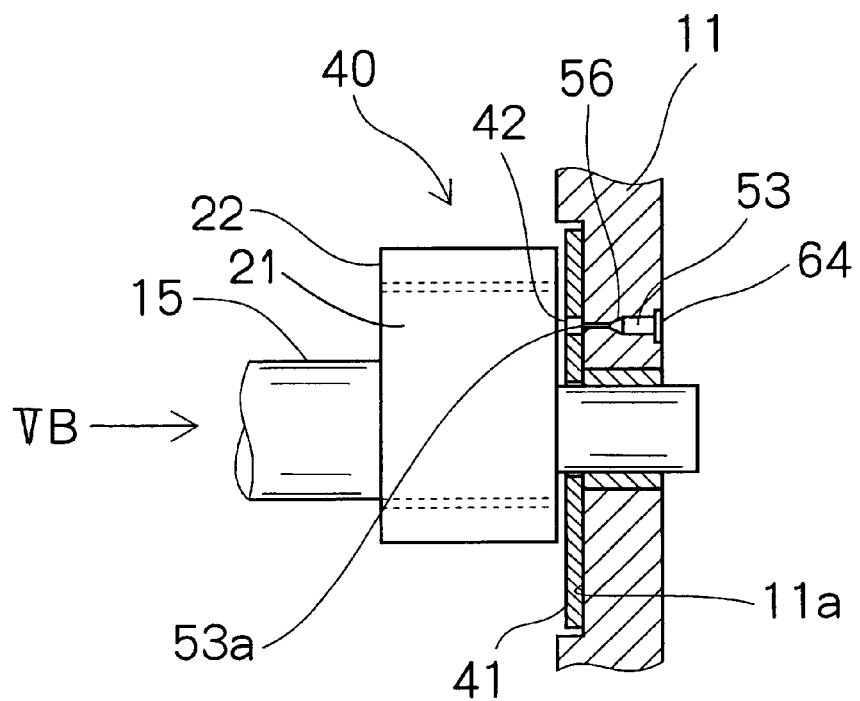
FIG. 5A is a cross sectional view showing a part of an accommodation chamber of the fuel injection pump according to the first embodiment.

As shown in FIG. 5A, the discharge port 64 of the feed pump 60 communicates with the accommodation chamber 40 through the communication path 53 that is formed in the housing body 11. The orifice 56 is provided in the communication path 53. A washer 41 is disposed between the cam 21 and housing body 11 for reducing frictional wear of contact between the cam 21 and the housing body 11. The washer 41 is fixed to a recess 11a formed in the housing body 11. The washer 41 is provided at a position corresponding to an end of the communication path 53 on a side of the accommodation chamber 40 with an opening 42. An end of the communication path 53 on a side opposite to the accommodation chamber 40 communicates with the discharge port 65 shown in FIG. 4. The discharge port 64 extends circumferentially within a range from D1 to D2 in FIG. 4.

Figure 5B:
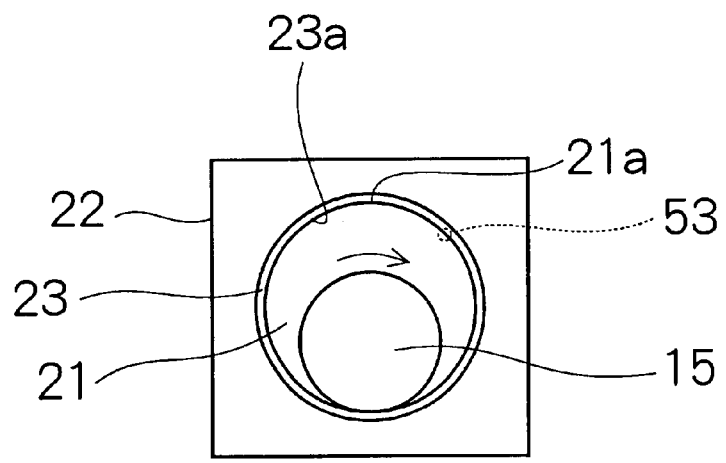
FIG. 5B is a perspective view as viewed along an arrow VB in FIG. 5A.

As shown in FIG. 5B, the bush 23 interposed between the cam 21 and cam ring 22 is fixed to an inner circumference of the cam ring 22. Inner circumference 23a of the bush 23 slides on an outer circumference 21a of the cam 21, as shown in FIG. 3. The inner circumference 23a of the bush 23 and the outer circumference 21a of the cam 21 constitute sliding contact portions. The cam 21 is formed integrally with the drive shaft 15 and rotates according to rotation of the drive shaft 15. Therefore, the cam ring 22 arranged around the cam 21 revolves about the cam 21 without self-rotating and moves upward and downward and in right and left directions in FIG. 5B.

When the cam 21 is at the angular position shown in FIG. 5B, the end 53a of the communication path 53 on a side of the accommodation chamber 40 is opened to the sliding contact portions of the cam 21 and the bush 23, as shown in FIGS. 5A and 5B. That is, the end 53a of the communication path 53 on a side of the accommodation chamber 40 is formed to face an axial end of a minute space between the sliding contact portions at least once in one rotation of the cam 21 together with the drive shaft 15. In the FIG. 5B, an enlarged view of the communication path 53 is shown to emphasize a positional relationship between the end 53a thereof and the sliding contact portions.

The orifice 56 throttles the fuel discharged from the discharge port 64 of the fee pump 60 and flowed into the communication path 53 so that the fuel is pressurized and flow speed of the fuel increases. The fuel passed through the orifice 56 is injected from the end 53a of the communication path 53 toward the accommodation chamber 40. When the axial end of the minute space between the sliding contact portions of the outer circumference 21a of the cam 21 and the inner circumference 23a of the bush 23 faces the end 53a of the communication path 53 at least once in one rotation of the cam 21, the fuel sprayed to the axial end of the minute space between the sliding contact portions flows under pressure toward the other axial end of the minute space between the sliding contact portions on a side opposite to the communication path 53. That is, the fuel is forcibly fed axially into the sliding contact portions for lubrication so that formation of oil film in the sliding contact portions is promoted.

According to the first embodiment, the sliding contact portions can be well lubricated by the fuel sprayed toward the sliding injection portions so that frictional seizure of the sliding contact portions is unlikely to occur and life time thereof is longer.

Further, the fuel injection pump 2 is compact since the sliding contact portions are well lubricated by positioning the end 53a of the communication path 53 in the housing body 11 so that the axial end of the sliding contact portions faces the end 53a of the communication path 53 at least once in one rotation of the cam 21.

Second Embodiment

A fuel injection pump 2 according to a second embodiment is described with reference to FIGS. 6A and 6B. Explanation of component parts similar to and affixed with the same reference numbers as those of the first embodiment is omitted.

Figure 6A:
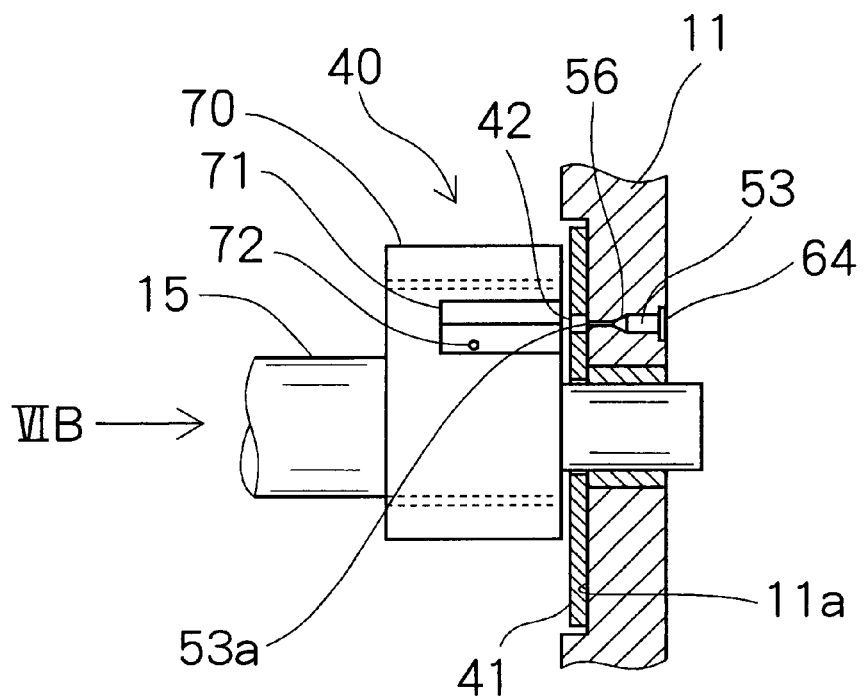
FIG. 6A is a cross sectional view showing a part of an accommodation chamber of a fuel injection pump according to a second embodiment.
Figure 6B:
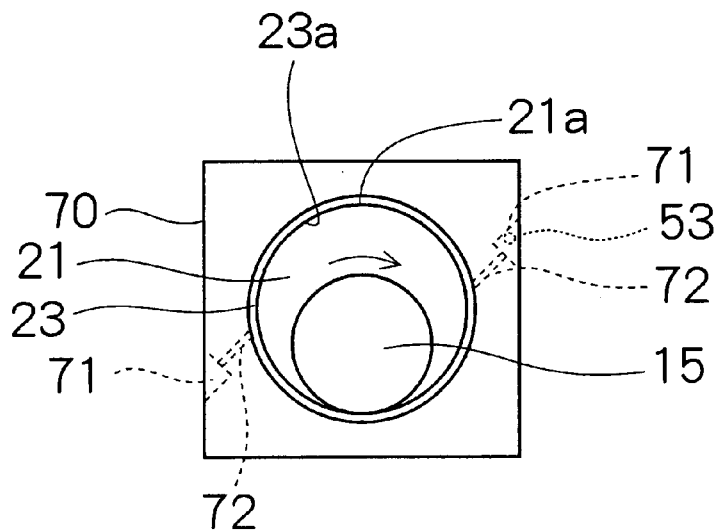
FIG. 6B is a perspective view as viewed along an arrow VIB in FIG. 6A.

As shown in FIGS. 6A and 6B, a cam ring 70 is provided on an outer circumference thereof with a groove 71 extending axially along an axis of the drive shaft 15 from an end of the outer circumference thereof on a side of the communication path 53 toward another end of the outer circumference thereof on a side opposite to the communication path 53 but coming to a dead-end before reaching the another end of the outer circumference thereof on a side opposite to the communication path 53. That is, an axial end of the groove 71 formed by recessing the outer circumference of the cam ring 70 along the axis of the drive shaft 15 is opened to the outer circumference thereof on a side of the communication path 53. The other axial end of the groove 71 is positioned between the outer circumferences thereof on a side of the communication path 53 and on a side opposite to the communication path 53. When the cam 21 is at a given angular position, the axial end of the groove 71 faces the end 53a of the communication path 53 on a side of the accommodation chamber 40. That is, the axial end of the groove 71 faces the end 53a of the communication path 53 at least once in one rotation of the cam 21. When the axial end of the groove 71 faces the end 53a, fuel sprayed from the end 53a of the communication path 53 toward the accommodation chamber 40 forcibly enters deep into the groove 71.

The cam ring 70 is provided with a guide hole 72 through which the groove 71 communicates with the minute space between the sliding contact portions of the outer circumference 21a of the cam 21 and the inner circumference 23a of the bush 23. The fuel forcibly entered the groove 71 is introduced to the minute space between the sliding contact portions through the guide hole 72. An end of the guide hole 72 on a side of the sliding contact portions communicates with the minute space between the sliding contact portions positioned about in an axial center of the cam ring 70, that is, in a middle between the axial end of the cam ring 70 on a side of the communication path 53 and the other end of the cam ring on a side opposite to the communication path 53. Accordingly, fuel is forcibly supplied to the sliding contact portions in a vicinity of the axial center of the cam ring 70 where formation of the oil film for lubrication tends to be insufficient, resulting in suppressing the frictional seizure of the sliding contact portions and securing a longer life time of the sliding contact portions.

As the fuel is forcibly supplied to the sliding contact portions about in the axial center thereof, entire axial surfaces of the sliding contact portions are covered uniformly with oil film for lubrication so that local frictional seizure and frictional wear of the sliding contact portions are suppressed.

A pair of the grooves 71 and the guide holes 53 may be provided symmetrically with respect to the axis of the cam ring 70.

Third Embodiment

A fuel injection pump 2 according to a third embodiment is described with reference to FIGS. 7A and 7B. Explanation of component parts similar to and affixed with the same reference numbers as those of the first embodiment is omitted.

Figure 7A:
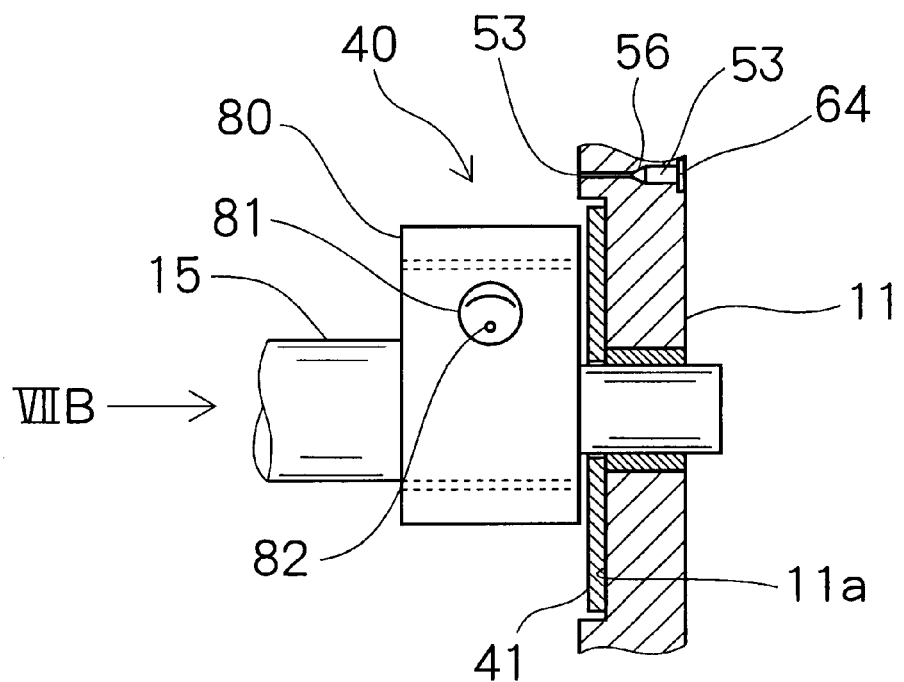
FIG. 7A is a cross sectional view showing a part of an accommodation chamber of a fuel injection pump according to a third embodiment.
Figure 7B:
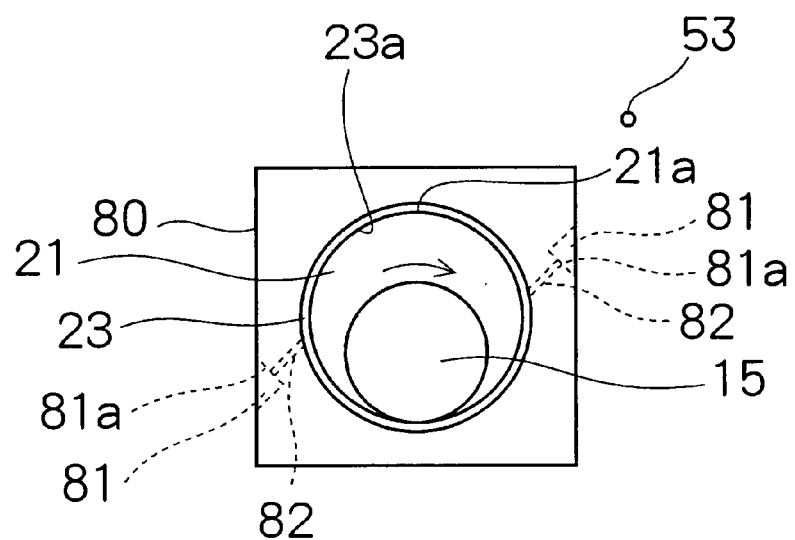
FIG. 7B is a perspective view as viewed along an arrow VIIB in FIG. 7A.

As shown in FIGS. 7A and 7B, a cam ring 80 is provided on an outer circumference thereof along an axis of the drive shaft 15 with recesses 81. The recesses 81 are positioned symmetrically with respect to an axis of the cam ring 80. The recesses 81 are formed by recessing the outer circumferences of the cam ring 80 opposed across the axis thereof.

The cam ring 80 is provided with guide holes 82. Each of the recesses 81 communicates, through each of the guide holes 82, with the minute space between the sliding contact portions of the outer circumference 21a of the cam and the inner circumference 23a of the bush 23. End of the guide hole 82 on a side of the recess 81 is opened to a bottom 81a of the recess 81. The fuel in the recess 81 is introduced to the minute space between the sliding contact portions through the guide hole 82. The other end of the guide hole 82 on a side of the sliding contact portions communicates with the minute space between the sliding contact portions positioned about in an axial center of the cam ring 80, similarly as the second embodiment.

According to the third embodiment, the end 53a of the communication path 53 on a side of the accommodation chamber 40 may be opened to any position of an inner wall of the accommodation chamber 40. Even if the axial end 593a of the communication path 53 is positioned radially outside the cam ring 80, fuel is supplied to the sliding contact portions about in the axial center of the cam ring 80 where formation of the oil film for lubrication tends to be insufficient, resulting in suppressing the frictional seizure of the sliding contact portions and securing a longer life time of the sliding contact portions.

Since the recesses 81 and guide holes 82 are positioned symmetrically with respect to the axis of the cam ring 80, the fuel for lubrication is easily flowed through either of the recesses 81 and guide holes 82 to the sliding contact portions when the cam ring 80 revolves about the cam 21 according to rotation of the drive shaft 15.

Fourth Embodiment

Figure 8A:
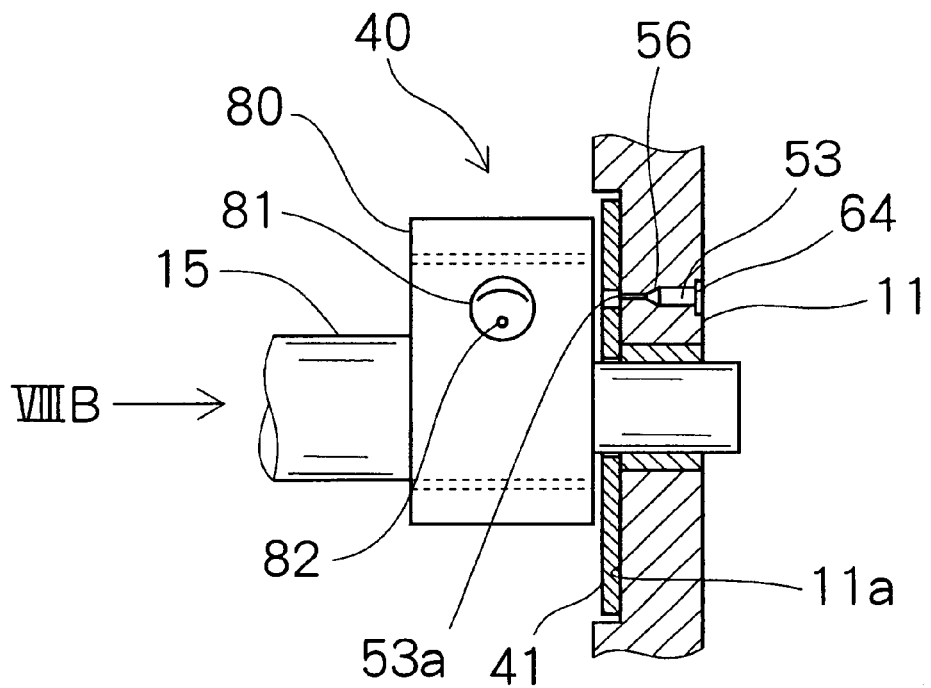
FIG. 8A is a cross sectional view showing a part of an accommodation chamber of a fuel injection pump according to a fourth embodiment.
Figure 8B:
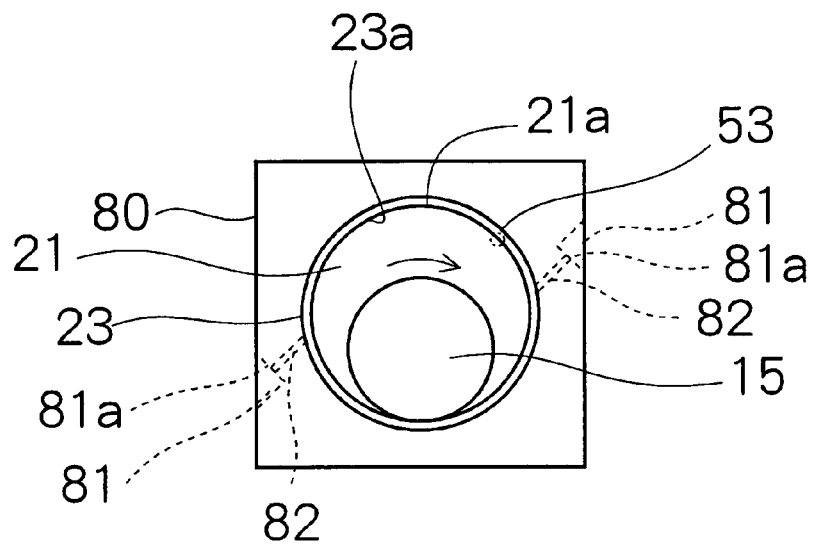
FIG. 8B is a perspective view as viewed along an arrow VIIIB in FIG. 8A.

A fuel injection pump 2 according to a fourth embodiment is described with reference to FIGS. 8A and 8B. The fourth embodiment is a modification of the third embodiment. Explanation of component parts similar to and affixed with the same reference numbers as those of the third embodiment is omitted.

According to the fourth embodiment, the position of the end 53a of the communication path 53 on a side of the accommodation chamber 40 is limited to a given point of the inner wall of the accommodation chamber 40 in the third embodiment. The end 53a of the communication path 53 on a side of the accommodation chamber 40 is at a position where the end 53a of the communication path 53 faces an axial end of the minute space between the sliding contact portions at least once in one rotation of the cam 21 together with the drive shaft 15, similarly as the first embodiment.

Therefore, not only the fuel sprayed from the communication path 53 to the accommodating chamber 40 is forcibly fed axially into the sliding contact portions but also the fuel is further supplied to the sliding contact portions about in the axial center of the cam ring 80 through the recesses 81 and the guide holes 82, resulting insufficiently suppressing the frictional seizure of the sliding contact portions and securing a much longer life time of the sliding contact portions.

Fifth Embodiment

Figure 9:
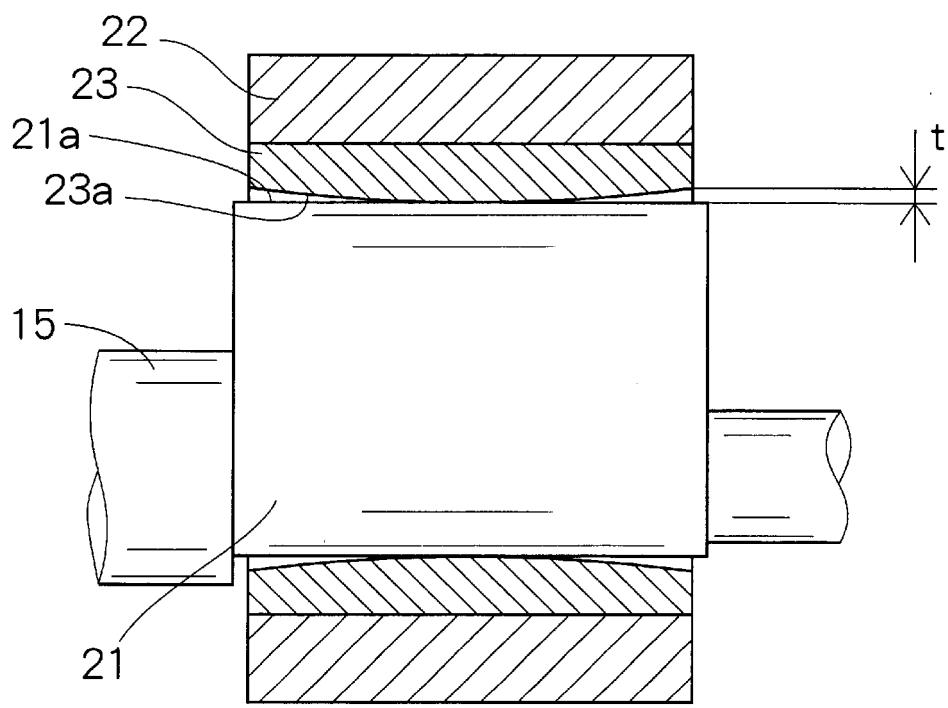
FIG. 9 is a schematic cross sectional view showing sliding contact portions of a cam and a bush in a fuel injection pump according to a fifth embodiment.

A fuel injection pump according to a fifth embodiment is described with reference to FIGS. 9 and 10. Explanation of component parts similar to and affixed with the same reference numbers as those of the first to fourth embodiments is omitted.

According to the fifth embodiment, the position of the end 53a of the communication path 53 on a side of the accommodation chamber 40 is not limited to a given point of the inner wall of the accommodation chamber 40, similarly as the third embodiment. The inner circumference 23a of the bush 23, which is in slidable contact with the outer circumference 21a of the cam 21, gradually protrudes radially inward from the axial opposite ends toward the axial center thereof. That is, inner diameter of the bush 23 is smaller from the axial opposite ends thereof toward the axial center thereof. A peak portion of the inner circumference 23a of the bush 23 whose inner diameter is the smallest is positioned midway between the opposite axial ends thereof. The inner circumference 23a of the bush 23 is formed axially in a curve.

A protruding amount t of the inner circumference 23a of the bush 23 toward the outer circumference 21a of the cam 21 falls within a range of 0 mm<t≦0.01 mm. To promote formation of oil film for lubrication, it is preferable that the inner diameter of the inner surface 23a is axially uniform without fluctuation, that is, the protruding amount t is zero. However, it is very difficult in view of fabrication accuracy to have the inner surface 23a whose protruding amount t is exactly zero. Therefore, according to the fifth embodiment, the protruding amount t is set to a value larger than 0 mm. It goes without saying that the protruding amount t closer to zero is better. However, if the protruding amount t exceeds 0.01 mm, contact between the inner circumference 23a and the outer circumference 21a is limited so that pressure per unit area applied to the sliding contact portions of the inner circumference 23a and the outer circumference 21a is too large. In case of 0 mm<t≦0.01 mm, tolerance for fabrication accuracy on forming the inner circumference 23a of the bush 23 is relatively large so that the bush is manufactured at less cost.

Figure 10:
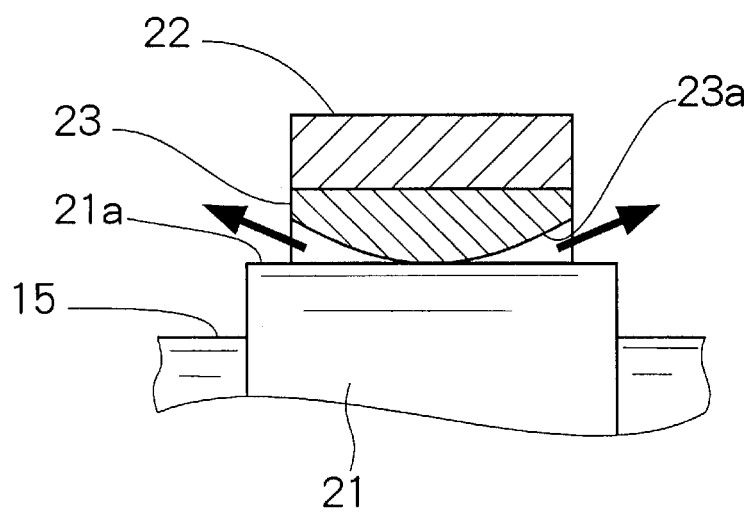
FIG. 10 is another schematic cross sectional view showing sliding contact portions of the cam and the bush in a fuel injection pump according to the fifth embodiment.

As shown in FIG. 10, a clearance between the inner circumference 23a of the bush 23 and the outer circumference 21a of the cam 21 is larger at opposite axial ends of the bush 23. Therefore, the fuel can easily enter the sliding contact portions from the opposite axial ends of the bush 23 toward the axial center thereof so that the oil film for lubrication is easily formed between the inner circumference 23a of the bush 23 and the outer circumference 21a of the cam 21.

Figure 14:
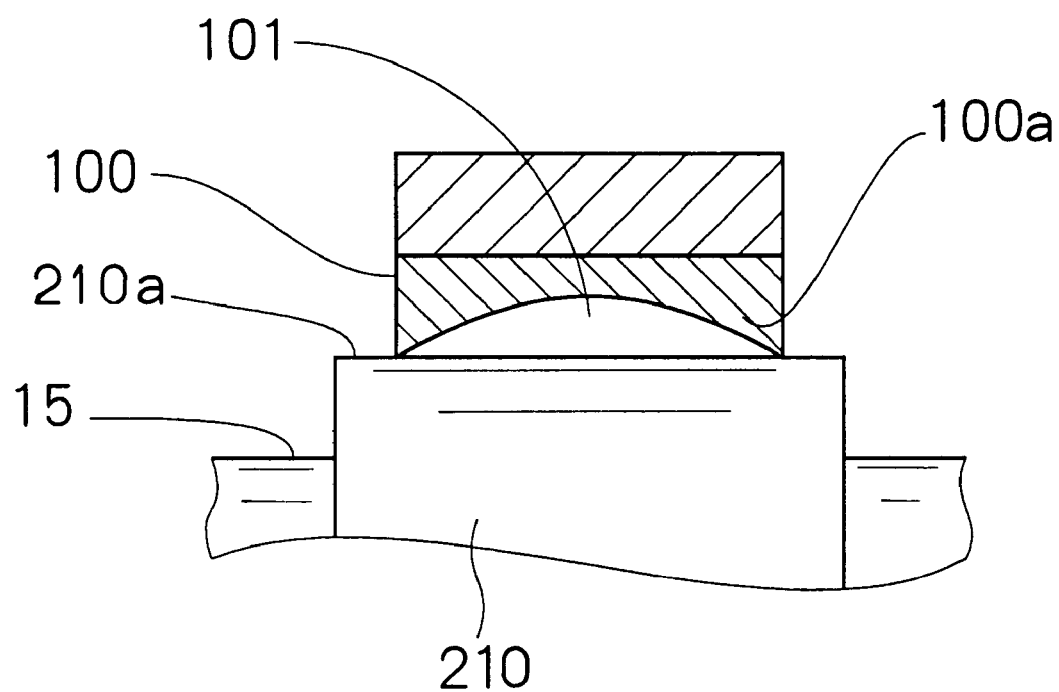
FIG. 14 is a schematic cross sectional view showing sliding contact portions of a cam and a bush in a conventional fuel injection pump as a prior art.

The fuel entered the sliding contact portions is heated due to sliding contact between the cam 21 and the bush 23. The heated fuel flows axially along the clearance between the inner circumference 23a of the bush 23 and the outer circumference 21a of the cam 21 toward the opposite axial ends of the bush 23 and is ejected to an outside (the accommodation chamber 40), as shown by arrows in FIG. 10. The heated fuel does not remain in the sliding contact portions shown in FIG. 14.

The clearance between the inner circumference 23a of the bush 23 and the outer circumference 21a of the cam 21 is smaller, pressure of the fuel entered the clearance more increases so that the formation of the oil film is more promoted. According to the fifth embodiment, since the inner circumference 23a of the bush 23 gradually protrudes radially inward from the axial opposite ends toward the axial center thereof, the clearance between the bush 23 and the cam 21 is smaller at the axial center thereof so that pressure of the fuel much more increases to enhance the formation of the oil film.

According to the fifth embodiment, it is not necessary to have a larger bush 23 or larger body of the fuel injection pump 2 for reducing the frictional seizure of the sliding contact portions. Further, the bush 23 does not need more expensive material whose heat resistance is higher so that the fuel injection pump is manufactured at less cost.

Sixth Embodiment

Figure 11:
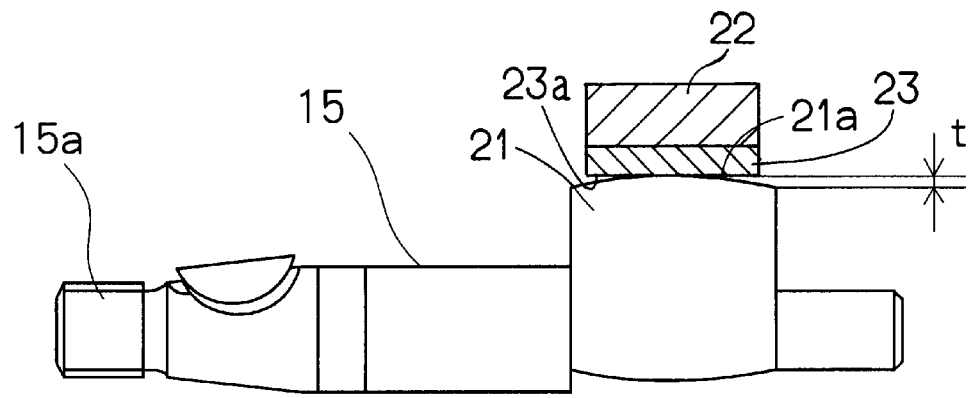
FIG. 11 is a schematic cross sectional view showing sliding contact portions of a cam and a bush in a fuel injection pump according to a sixth embodiment.

A fuel injection pump 2 according to a sixth embodiment is described with reference to FIG. 11. The sixth embodiment is a modification of the fifth embodiment. Explanation of component parts similar to and affixed with the same reference numbers as those of the fifth embodiment is omitted.

According to the sixth embodiment, shapes of inner circumference 23a of the bush 23 and outer circumference 21a of the cam 21 are different from those of the fifth embodiment. The inner circumference 23a is formed axially in flat. The outer circumference 21a of the cam 21, which is in slidable contact with the inner circumference 23a of the bush 23, gradually protrudes radially outward from the axial opposite ends toward the axial center thereof. That is, outer diameter of the cam 21 is larger from the axial opposite ends thereof toward the axial center thereof. A peak portion of the outer circumference 21a of the cam 21 whose outer diameter is the largest is positioned midway between the opposite axial ends thereof. The outer circumference 21a of the cam 21 is formed axially in a curve.

A protruding amount t of the outer circumference 21a of the cam 21 toward the inner circumference 23a of the bush 23 falls within a range of 0 mm<t≦0.01 mm.

According to the sixth embodiment, the fuel can easily enter the sliding contact portions from the opposite axial ends of the bush 23 toward the axial center thereof so that the oil film for lubrication is easily formed between the inner circumference 23a of the bush 23 and the outer circumference 21a of the cam 21.

The fuel heated is easily ejected from the clearance between the inner circumference 23a of the bush 23 and the outer circumference 21a of the cam 21 to an outside (the accommodation chamber 40) so that the bush 23 and the cam 21 are hardly damaged by heat, resulting in reducing the frictional seizure of the sliding contact portions.

Seventh Embodiment

Figure 12:
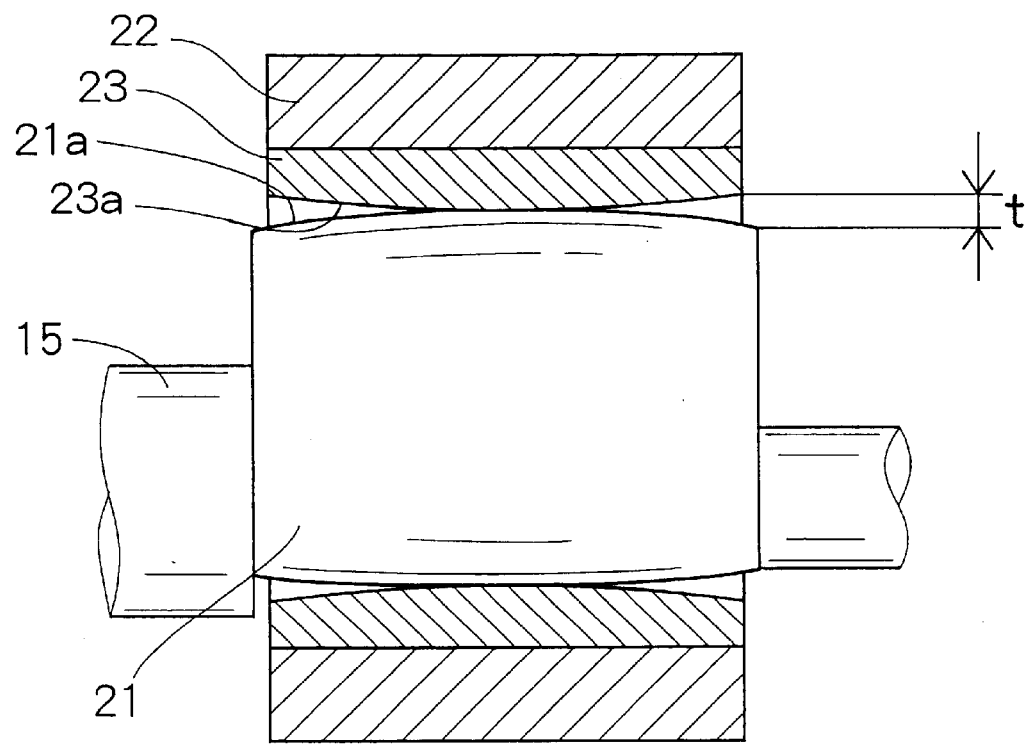
FIG. 12 is a schematic cross sectional view showing sliding contact portions of a cam and a bush in a fuel injection pump according to a seventh embodiment.

A fuel injection pump 2 according to a seventh embodiment is described with reference to FIG. 12. The seventh embodiment is a combination of the fifth and sixth embodiments. Explanation of component parts similar to and affixed with the same reference numbers as those of the fifth and sixth embodiments is omitted.

According to the seventh embodiment, the inner circumference 23a of the bush 23 gradually protrudes radially inward from the axial opposite ends toward the axial center thereof, similarly as the fifth embodiment. That is, the inner circumference 23a of the bush 23 is formed axially in a curve. On the other hand, the outer circumference 21a of the cam 21 gradually protrudes radially outward from the axial opposite ends toward the axial center thereof, similarly as the sixth embodiment. The outer circumference 21a of the cam 21 is formed axially in a curve.

In this case, a sum t of a protruding amount of the inner circumference 23a of the bush 23 toward the outer circumference 21a of the cam 21 and a protruding amount of the outer circumference 21a of the cam 21 toward the inner circumference 23a of the bush 23 falls within a range of 0 mm<t≦0.01 mm. A clearance between the inner circumference 23a of the bush 23 and the outer circumference 21a of the cam 21 is larger at opposite axial ends of the bush 23 than at an axial center thereof.

The seventh embodiment has the same advantage as described in the fifth or sixth embodiment.

Eighth Embodiment

A fuel injection pump 2 according to an eighth embodiment is described with reference to FIG. 13. Explanation of component parts similar to and affixed with the same reference numbers as those of the first embodiment is omitted.

According to the eighth embodiment, the position of the end 53a of the communication path 53 on a side of the accommodation chamber 40 is not limited to a given point of the inner wall of the accommodation chamber 40, similarly as the third embodiment or the fifth to seventh embodiments.

Figure 13:
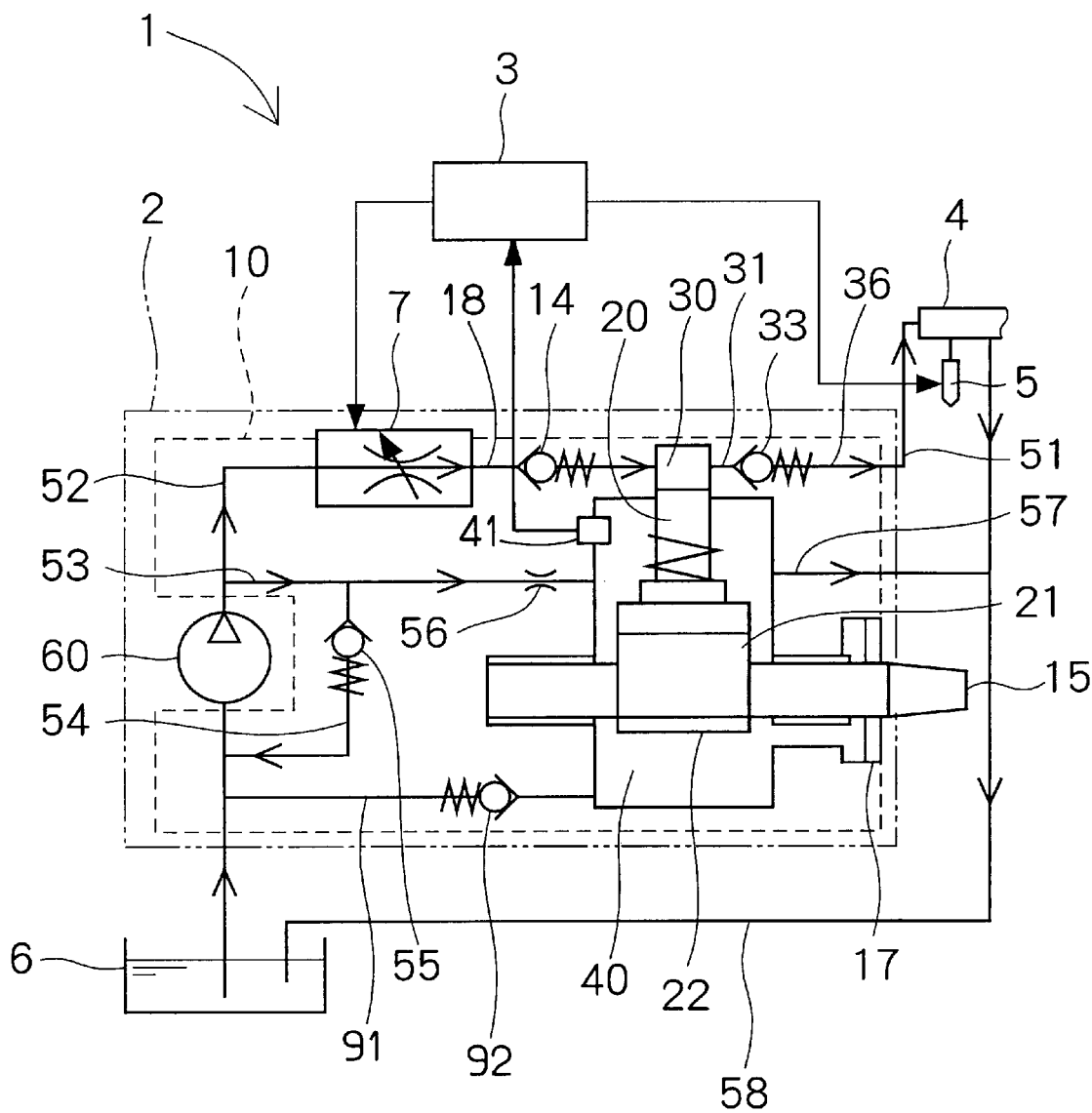
FIG. 13 is a schematic diagram of a fuel injection system incorporating a fuel injection pump according to an eighth embodiment.

According to the eighth embodiment, as shown in FIG. 13, a temperature sensor 41 is provided for detecting temperature in the accommodation chamber 40. The temperature sensor 41 is connected in circuit with ECU 3 and outputs an electric signal representing the temperature of the accommodation chamber 40. Further, the housing 10 is provided in addition to the fuel-ejecting path 57 and the circulation flow passage 58 with a circulation flow passage 91 through which the accommodation chamber 40 and the inlet side of the feed pump 60 communicate with each other and a check valve 92 disposed in the circulation flow passage 54. The circulation flow passage 54 and the check valve constitute an abnormal pressure preventing member.

The check valve 92 serves to permit only fuel flow from the accommodation chamber 40 to the inlet side of the feed pump 60. The check valve 92 is normally closed and is opened when pressure in the accommodation chamber 40 exceeds a given pressure. When the check valve 92 is opened, fuel in the pressure chamber 40 is returned to the inlet side of the feed pump 60.

For example, when the fuel-ejecting path 57 or the circulation flow passage 58 is blocked in such a manner that the fuel-ejecting path 57 or the circulation flow passage 58 is sharply bent by outside shock or stuffed with foreign material containing in the fuel, the fuel supplied from the feed pump 60 to the accommodation chamber 40 is not ejected from the accommodation chamber so that fuel pressure in the accommodation chamber 40 increases. As a result, higher pressure of the accommodation chamber 40 is applied to the oil seal through the fuel passage 19. In case that the pressure of fuel applied to the seal 17 exceeds endurable pressure of the oil seal 17, the oil seal 17 tends to be damaged.

Accordingly, if valve opening pressure of the check valve 92 is set to a pressure smaller than the endurable pressure of the oil seal 17, the check valve 92 is opened before the pressure of accommodation chamber 40 exceeds the endurable pressure of the oil seal 17, so the fuel in the accommodation chamber 40 is returned via the fuel return passage 91 to the inlet side of the feed pump 60 without increasing abnormally the pressure of the accommodation chamber 40 and damaging the oil seal 17.

When the check valve 92 continuously opens, the fuel is circulated between the feed pump 60 and the accommodation chamber 40. As heat is generated from the sliding contact portions of the plunger 20 and the cam ring 22, the sliding contact portions of the bush 23 and the cam 21 and so on according to the operation of the fuel injection pump 2, temperature of the fuel circulating between the feed pump 60 and the accommodation chamber 40 increases so that the frictional seizure of the sliding contact portions may occur.

According to the eighth embodiment, when temperature of the accommodation chamber 40, that is detected by the temperature sensor 41, exceeds a given temperature, ECU 3 instructs to stop the operation of the fuel injection pump 2, for example, in such a manner that the fuel amount adjusting valve 7 is closed to stop fuel supply from the feed pump 60 to the pressure chamber 30. As a result, fuel supply to the common rail 4 and fuel injection to the combustion chambers of the engine from the injector 5 stop so that operation of the engine stops before the frictional seizure of the sliding contact portions occurs and the fuel injection pump 2 is broken down.

Instead of forming an entire part of the fuel return passage 91 within the housing 10, a part of the fuel return passage 91 may be formed outside the housing 10.

What is claimed is:

1. A fuel injection pump comprising:

a drive shaft rotatable;

a cam formed eccentrically and integrally with the drive shaft;

a cam ring;

a bush whose outer circumference is fixed to inner circumference of the cam ring and whose inner circumference is slidably fitted to outer circumference of the cam shaft so that sliding contact portions of the eccentric cam and the bush are formed;

a housing provided with a cylindrical bore;

a plunger axially and reciprocatingly movable in the cylindrical bore via the cam, the bush and the cam ring by the drive shaft, axial end of the plunger being in slidable contact with outer circumference of the cam ring so that another axial end thereof and the cylindrical bore form a pressure chamber;

an accommodation chamber formed in the housing for accommodating the plunger, the bush, the cam ring and the cam;

a feed pump whose outlet side communicates with the pressure chamber for supplying fuel to the pressure chamber according to rotation of the drive shaft; and a communication path through which the outlet side of the feed pump also communicates with the accommodation chamber for supplying a part of the fuel discharged from the feed pump to the accommodation chamber, wherein at least one of the inner circumference of the bush and the outer circumference of the cam gradually protrudes radially toward the other one of the inner circumference of the bush and the outer circumference of the cam from the axial opposite ends to the axial center thereof.

2. A fuel injection pump according to claim 1, wherein only one of the inner circumference of the bush and the outer circumference of the cam gradually protrudes radially toward the other one of the inner circumference of the bush and the outer circumference of the cam.

3. A fuel injection pump according to claim 2, wherein the one of the inner circumference of the bush and the outer circumference of the cam protruding radially toward the other one thereof is formed axially in a curve.

4. A fuel injection pump according to claim 2, wherein a protruding amount t of the one of the inner circumference of the bush and the outer circumference of the cam falls within a range of 0 mm$<t\leqq 0.01$ mm.

5. A fuel injection pump according to claim 2, wherein a sum t of a protruding amount of the inner circumference of the bush and a protruding amount of the outer circumference of the cam falls within a range of 0 mm$<t\leqq 0.01$ mm.

6. A fuel injection pump according to claim 1, wherein the inner circumference of the bush protrudes radially inward toward the outer circumference of the cam and the outer circumference of the cam protrudes radially outward toward the inner circumference of the bush.

7. A fuel injection pump according to claim 6, wherein each of the inner circumference of the bush and the outer circumference of the cam is formed axially in a curve.

\* \* \* \* \*